(12) United States Patent
Saliba

(10) Patent No.: US 7,256,963 B2
(45) Date of Patent: Aug. 14, 2007

(54) MAGNETIC HEAD WITH ADAPTIVE DATA ISLAND AND MINI-OUTRIGGER AND METHODS OF MANUFACTURE

(75) Inventor: George A. Saliba, Northborough, MA (US)

(73) Assignee: Quantum Corporation, San Jose, CA (US)

( * ) Notice: Subject to any disclaimer, the term of this patent is extended or adjusted under 35 U.S.C. 154(b) by 390 days.

(21) Appl. No.: 10/944,559

(22) Filed: Sep. 16, 2004

(65) Prior Publication Data

US 2006/0056109 A1    Mar. 16, 2006

(51) Int. Cl.
*G11B 5/10* (2006.01)
*G11B 5/11* (2006.01)

(52) U.S. Cl. ............... 360/129; 29/603.07; 29/603.12
(58) Field of Classification Search ............... 360/129; 29/603.07, 603.12
See application file for complete search history.

(56) References Cited

U.S. PATENT DOCUMENTS

| | | | |
|---|---|---|---|
| 3,663,765 A | 5/1972 | Schneider | |
| 3,665,436 A | 5/1972 | Murray et al. | |
| 3,947,887 A | * 3/1976 | Platter | 360/221 |
| 3,961,372 A | 6/1976 | Brock et al. | |
| 4,123,791 A | * 10/1978 | Rotter et al. | 360/130.21 |
| 4,251,841 A | 2/1981 | Jacobs | |
| 4,300,179 A | 11/1981 | Barnes et al. | |
| 4,418,473 A | 12/1983 | Burkhart et al. | |
| 4,430,440 A | 2/1984 | Wada et al. | |
| 4,649,448 A | 3/1987 | Nakajima | |
| 4,650,774 A | 3/1987 | Kawaguchi et al. | |
| 4,686,596 A | 8/1987 | Kraemer et al. | |
| 4,695,909 A | 9/1987 | Momata et al. | |
| 4,709,284 A | 11/1987 | Endo et al. | |
| 4,809,110 A | 2/1989 | Hertrich | |

(Continued)

FOREIGN PATENT DOCUMENTS

EP        0 437 147 A2    7/1991

(Continued)

OTHER PUBLICATIONS

IBM (Jul. 1976). "Magnetic Head Construction," *IBM Tech. Discl. Bulletin* 19(2):397.

*Primary Examiner*—Andrea Wellington
*Assistant Examiner*—Christopher R. Magee
(74) *Attorney, Agent, or Firm*—Morrison & Foerster LLP

(57) ABSTRACT

In one aspect, an exemplary method of manufacturing a magnetic head assembly is provided. In one example, the method includes forming islands in a magnetic head structure to define a pair of mini-outriggers adjacent a data island, where the data island is separated from each mini-outrigger by a void, and a width of the data island along a direction of tape transport is greater than a width of the mini-outrigger. The method further includes lapping the head structure to remove a portion of the mini-outrigger, thereby creating a wrap angle between the tape and the surface of the data island. In one example, the lapping process reduces the mini-outrigger height relative to the data island in an adaptive manner, where the final contour and height of the mini-outrigger is influenced by the data island surface, e.g., by the width, radius of curvature, and the like.

28 Claims, 5 Drawing Sheets

U.S. PATENT DOCUMENTS

| | | | |
|---|---|---|---|
| 4,814,915 A | 3/1989 | Wada et al. | |
| 4,835,640 A | 5/1989 | Endo et al. | |
| 4,839,959 A * | 6/1989 | Mersing | 29/603.1 |
| 4,868,697 A | 9/1989 | McClure | |
| 4,875,129 A * | 10/1989 | Favrou et al. | 360/122 |
| 4,888,657 A * | 12/1989 | Lacey et al. | 360/122 |
| 4,949,208 A | 8/1990 | Milo et al. | |
| 5,008,767 A | 4/1991 | Iwata et al. | |
| 5,034,838 A * | 7/1991 | Brock et al. | 360/122 |
| 5,049,454 A | 9/1991 | Johnson et al. | |
| 5,055,959 A | 10/1991 | Saliba | |
| 5,065,500 A | 11/1991 | Yoneda et al. | |
| 5,136,775 A | 8/1992 | Onoe et al. | |
| 5,161,299 A | 11/1992 | Denison et al. | |
| 5,203,119 A * | 4/1993 | Cole | 451/11 |
| 5,426,551 A | 6/1995 | Saliba | |
| 5,436,780 A | 7/1995 | Nagata et al. | |
| 5,469,313 A | 11/1995 | Isozaki et al. | |
| 5,475,553 A | 12/1995 | Saliba | |
| 5,574,606 A | 11/1996 | Kimura | |
| 5,602,704 A | 2/1997 | Gooch et al. | |
| 5,663,856 A | 9/1997 | Packard | |
| 5,706,149 A * | 1/1998 | Hoelsaeter | 360/261.3 |
| 5,737,152 A | 4/1998 | Balakrishnan | |
| 5,737,158 A | 4/1998 | Tanaka et al. | |
| 5,751,527 A | 5/1998 | Sundaram et al. | |
| 5,754,369 A | 5/1998 | Balakrishnan | |
| 5,771,142 A | 6/1998 | Maurice et al. | |
| 5,862,014 A | 1/1999 | Nute | |
| 5,883,770 A | 3/1999 | Biskeborn et al. | |
| 5,905,613 A | 5/1999 | Biskeborn et al. | |
| 5,953,184 A | 9/1999 | Barber et al. | |
| 5,963,401 A | 10/1999 | Dee et al. | |
| 5,969,912 A | 10/1999 | Cope | |
| 6,040,964 A | 3/2000 | Saliba | |
| 6,188,532 B1 | 2/2001 | Albrecht et al. | |
| 6,282,055 B1 | 8/2001 | Lakshmikumaran et al. | |
| 6,288,870 B1 | 9/2001 | Saliba | |
| 6,341,416 B1 * | 1/2002 | Biskeborn et al. | 29/603.12 |
| 6,369,982 B2 | 4/2002 | Saliba | |
| 6,424,499 B1 | 7/2002 | Balakrishnan et al. | |
| 6,433,959 B1 | 8/2002 | Lakshmikumaran et al. | |
| 6,469,867 B2 | 10/2002 | Saliba | |
| 6,577,470 B1 | 6/2003 | Rumpler | |
| 6,587,305 B2 | 7/2003 | Saliba | |
| 6,606,219 B2 | 8/2003 | Lam | |
| 6,611,398 B1 | 8/2003 | Rumpler et al. | |
| 6,690,542 B1 | 2/2004 | Wang | |
| 6,700,733 B1 | 3/2004 | Biskeborn | |
| 6,927,937 B2 * | 8/2005 | Aoki | 360/122 |
| 6,937,435 B2 * | 8/2005 | Saliba | 360/122 |
| 7,006,329 B2 * | 2/2006 | Johnson et al. | 360/221 |
| 7,154,691 B2 * | 12/2006 | Girvin et al. | 360/61 |
| 2002/0141112 A1 | 10/2002 | Saliba | |
| 2003/0076631 A1 | 4/2003 | Torline et al. | |
| 2003/0214745 A1 | 11/2003 | Lau | |

FOREIGN PATENT DOCUMENTS

| | | |
|---|---|---|
| EP | 0 437 147 A3 | 7/1991 |
| EP | 0 437 147 B1 | 7/1991 |
| EP | 0 439 943 A2 | 8/1991 |
| EP | 0 439 943 A3 | 8/1991 |
| EP | 0 469 618 A2 | 2/1992 |
| EP | 0 469 618 A3 | 2/1992 |
| EP | 0 469 618 B1 | 2/1992 |
| EP | 0 550 890 A2 | 7/1993 |
| EP | 0 550 890 A3 | 7/1993 |
| EP | 0 550 890 B1 | 7/1993 |
| EP | 0 590 701 A2 | 4/1994 |
| EP | 0 590 701 A3 | 4/1994 |
| EP | 0 590 701 B1 | 4/1994 |
| EP | 0 710 392 B1 | 5/1996 |
| JP | 62-259208 A | 11/1987 |
| JP | 63-231707 A | 9/1988 |
| JP | 3-141015 A | 6/1991 |
| WO | WO-81/00780 A1 | 3/1981 |
| WO | WO-89/06420 A1 | 7/1989 |
| WO | WO8906425 A1 * | 7/1989 |
| WO | WO-95/03606 A1 | 2/1995 |

* cited by examiner

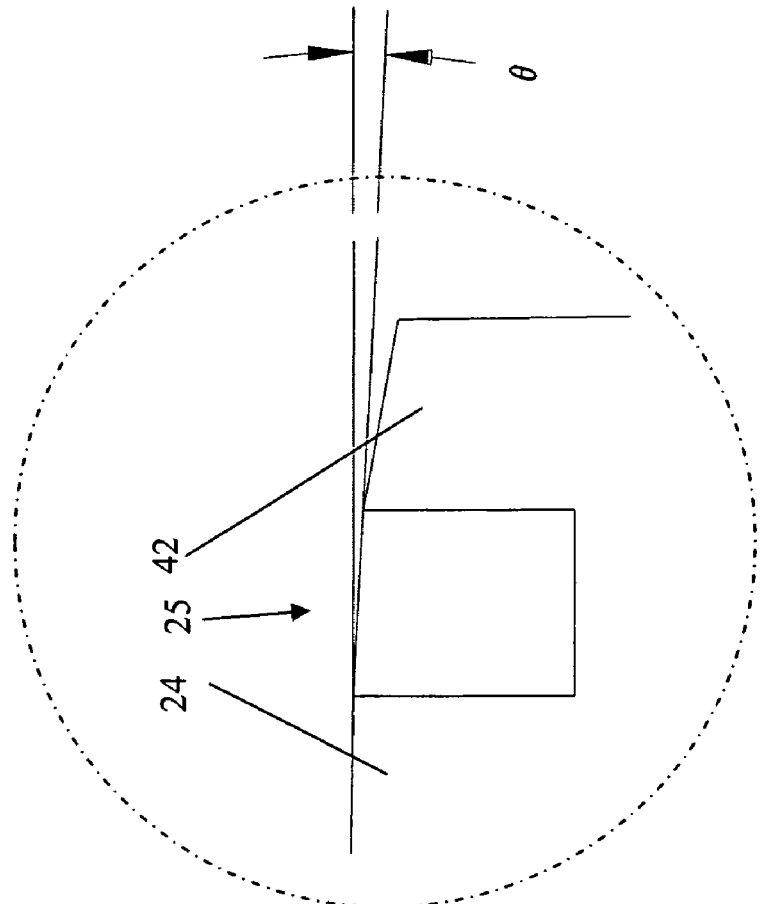
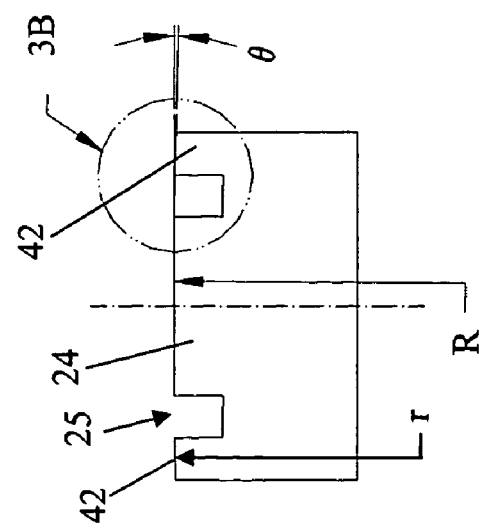
Figure 3A
Figure 3B

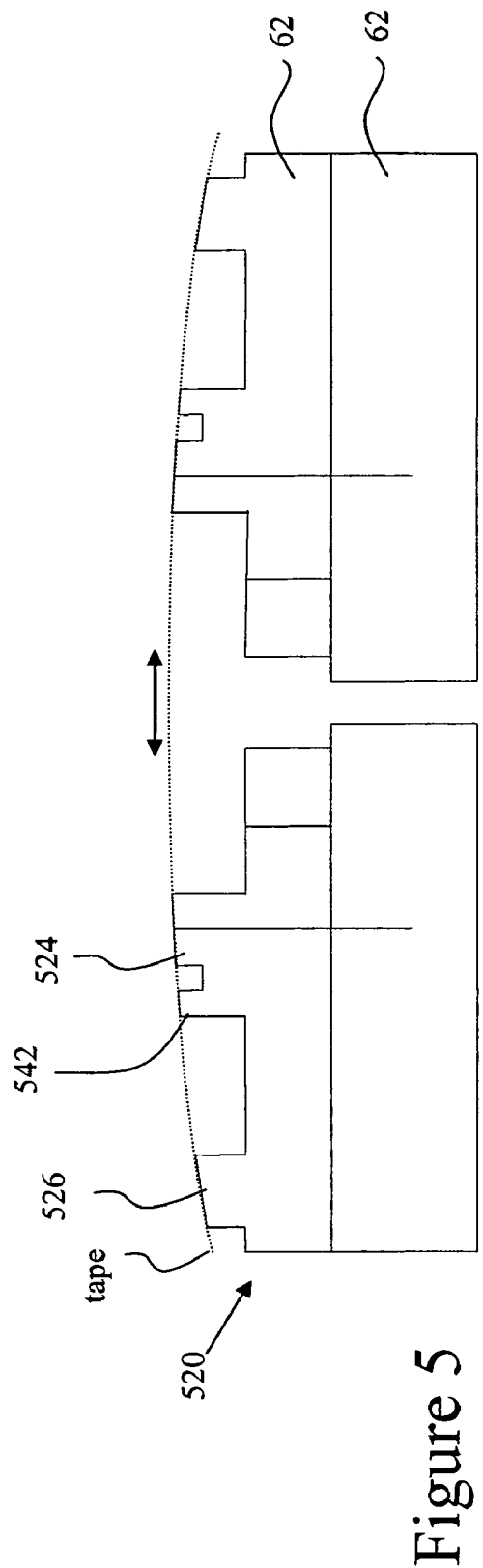
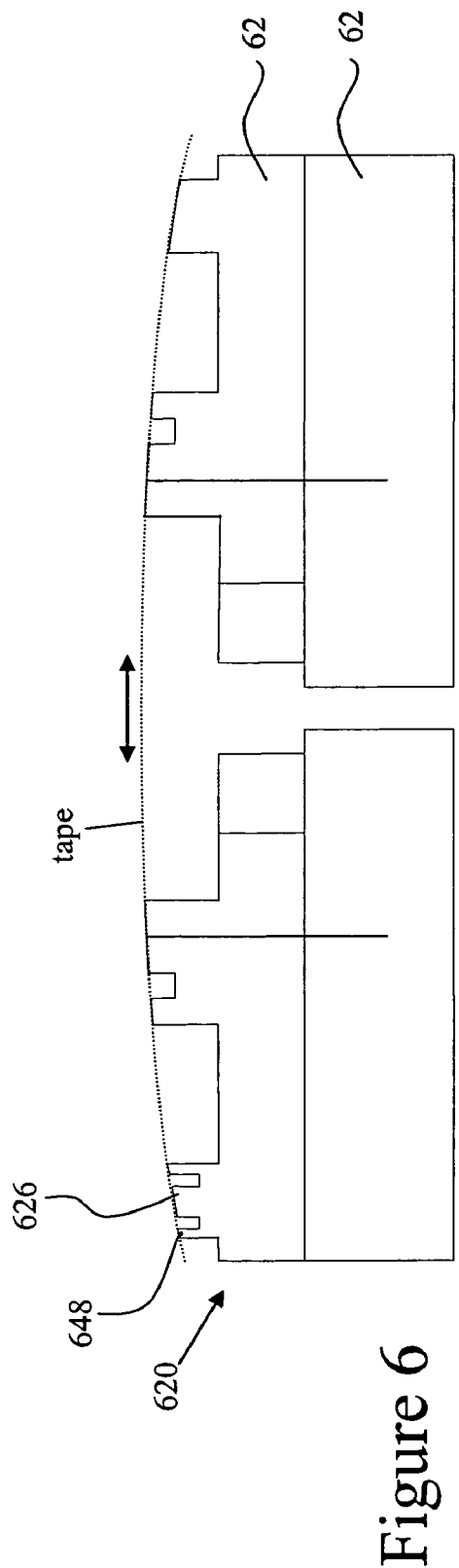

MAGNETIC HEAD WITH ADAPTIVE DATA ISLAND AND MINI-OUTRIGGER AND METHODS OF MANUFACTURE

BACKGROUND OF THE INVENTION

1. Field of the Invention

The present invention relates generally to magnetic tape read and/or write heads, and more particularly to magnetic tape read and/or write heads having mini-outriggers adjacent active data islands.

2. Description of the Related Art

Magnetic tape continues to be an efficient and effective medium for data storage in computer systems. Increased data storage capacity and retrieval performance is desired of all commercially viable mass storage devices and media. In the case of linear tape recording, a popular trend is toward multi head, multi-channel fixed head structures with narrowed recording gaps and data track widths so that many linear data tracks may be achieved on a tape medium of a predetermined width, such as one-half inch width tape. To increase the storage density and reduce access time of magnetic tapes, data tracks on the tape are arranged with greater density and the tape is streamed by a tape head at increasingly faster rates.

Magnetic tape heads typically include an active device region with embedded transducers across which the magnetic tape advances. The data transducers are included on raised strips or ridges, commonly referred to as data islands or bumps, which provide a raised tape support or wear surface for which the magnetic tape wraps around during use. In other examples where the tape is flown over the head structure, data transducers may be included on a contoured head surface having aerodynamic bleed slots or the like, which cause the tape separation to be reduced over the data transducers.

FIG. 7 illustrates an exemplary multi-bump head 720 having three data islands 724 and two outriggers 726. Data islands 724 include one or more data transducers. The data transducers may include recording elements for writing information onto a magnetic tape and/or reproducing elements for reading information from a magnetic tape. An embedded recording element produces a magnetic field in the vicinity of a small gap in the core of the element, which causes information to be stored on magnetic tape as it moves across the support surface. In contrast, a reproducing element detects a magnetic field from the surface of magnetic tape as the tape moves over the support surface. Typically, the center island 724 will include write elements and the outer islands 724 include read elements to perform read-write functions in both directions as is known in the art. Modern heads generally utilize photolithography and MR head technology, able to deposit a combination read and write elements on the same island, where typically only two bumps are needed for forward and reverse operation.

Additionally, conventional heads may be provided with "outrigger" islands on both sides of the head which help support the tape and control the wrap angle of the tape with the island therebetween. Outriggers, e.g., outriggers 726, are generally similar in size and shape to islands 724. Exemplary head configurations, including data islands and outriggers, are described in U.S. Pat. No. 4,809,110, which is hereby incorporated by reference in its entirety as if fully set forth herein.

Generally, there is a microscopic separation between an active device region of the tape head, including recording and reproducing elements, and the tape during operation that reduces the strength of the magnetic field coupled to the tape surface during the recording process. The small separation reduces the coupling between the tape field and the reproducing element, causing a signal loss. This reduction in magnetic field strength is generally referred to as a "spacing loss." The magnetic field strength detected by a tape or a reproducing element is proportional to $e^{-kd/\lambda}$, where d is the head-to-tape separation, $\lambda$ is the recording wavelength, and k is a constant. The detected magnetic field strength decreases exponentially both with respect to separation between the tape and the support surface and with respect to recording density (which is inversely related to the recording wavelength). Thus, while a limited amount of head-to-tape separation might be acceptable at low recording densities (100-200 KFCI), smaller transducers used with magnetic tapes of higher recording densities (over 200 KFCI) can tolerate little to no head-to-tape separation.

Further, to allow for faster access and write times, the media may be advanced by a head at speeds ranging from 100 to 1,000 inches per second or more. Increased media speed, however, may entrap air between a support surface of the head and media. Improper contour at one extreme may allow the air to cause separation or at the other extreme it could result in excessive high contact pressure between the media and the support surface leading to signal loss and/or excessive damage to the media.

The amount of head-to-tape separation may be reduced by adjusting the wrap angle of the tape around the head structures (e.g., the outriggers and the islands) to create tension in the tape and reduce the amount of air that may become entrapped. However, increased tension may cause an increase in the contact pressure between the tape and head that may damage the media and/or the head. One method to reduce pressure includes reducing the wrap angle according to the principles described in U.S. Pat. No. 4,809,110, entitled NARROW CONTOUR HEAD ASSEMBLY. The '110 patent describes, for example, that if the wrap angle is too large, a bubble or arc may occur, creating a separation between the tape and the head structure. Further, if the wrap angle is too small the tape may entrap air as it advances over the head structure and increases the separation therebetween. Accordingly, high-speed tape drive systems are generally designed with precise tape paths and contoured tape heads to achieve a desired wrap angle. Manufacturing contoured tape heads with desired wrap angles is generally costly and complicated.

Increased tension in the tape and resulting pressure between the storage media and the head to prevent spacing loss has several deleterious consequences to both the storage media and the head. For example, increased tension and pressure may reduce tape life and increase the possibility of tape damage and data loss. Tape damage may lead to increased lateral tape motion and decreased reliability. Increased tension and pressure may also cause the head structure and tape to wear more quickly resulting in shortened tape and head life.

What is desired is a read/write head structure that presents an appropriate wrap angle to the magnetic tape to decrease spacing loss between the active device regions and the magnetic tape and reduce pressure (and resulting wear) between the magnetic tape and the head structure. Further, a head structure with reduced manufacturing complexity and cost is desired.

BRIEF SUMMARY OF THE INVENTION

In one aspect, an exemplary method of manufacturing a magnetic head assembly with a desired wrap angle is provided. In one example, the method includes forming islands in a magnetic head structure to define a pair of mini-outriggers adjacent a data island, where the data island is separated from each mini-outrigger by a void, and a width of the data island along a direction of tape transport is greater than a width of the mini-outriggers. The method further includes lapping the head structure to remove a portion of the mini-outrigger, thereby creating a wrap angle between the tape and the surface of the data island. In one example, the lapping process reduces the mini-outrigger height relative to the data island in an adaptive manner, where the final contour and height of the mini-outriggers are influenced by the data island surface, e.g., by the width, radius of curvature, and the like.

In another aspect, an exemplary magnetic head assembly for writing and/or reading from magnetic recording media is provided. In one example, a magnetic head includes a data island associated with at least one data transducer, the data island having a width along a direction of media transport and a radius of curvature. The magnetic head further including a pair of mini-outriggers placed adjacent to the data island and separated by a void, wherein a width of each of the mini-outriggers along the direction of media transport is less than the width of the data island. In one example, the radius of curvature of each of the mini-outriggers varies. Additionally, in one example, the radius of curvature of the mini-outriggers is less than the radius of curvature of the data island. The wrap angle of magnetic storage tape to the data island may be less than 3 degrees. Further, the radius of curvature of the mini-outrigger may be less than one-half the radius of curvature of the data island.

Various aspects and examples of the present invention are better understood upon consideration of the detailed description below in conjunction with the accompanying drawings and claims.

BRIEF DESCRIPTION OF THE DRAWINGS

FIGS. 3A and 3B illustrate an exemplary data island and mini-outrigger in greater detail;

FIG. 5 illustrates another exemplary head including a single mini-outrigger;

FIG. 6 illustrates another exemplary head including a mini-outrigger adjacent a primary outrigger.

DETAILED DESCRIPTION OF THE INVENTION

Figure 1:
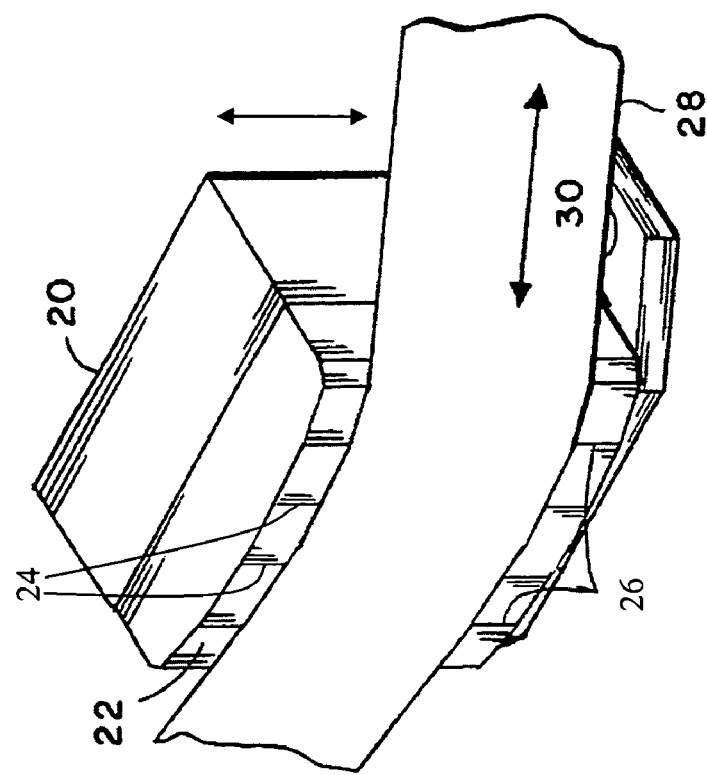
FIG. 1 illustrates a perspective view of an exemplary head structure including paired data islands having mini-outriggers and primary outriggers.
Figure 7:
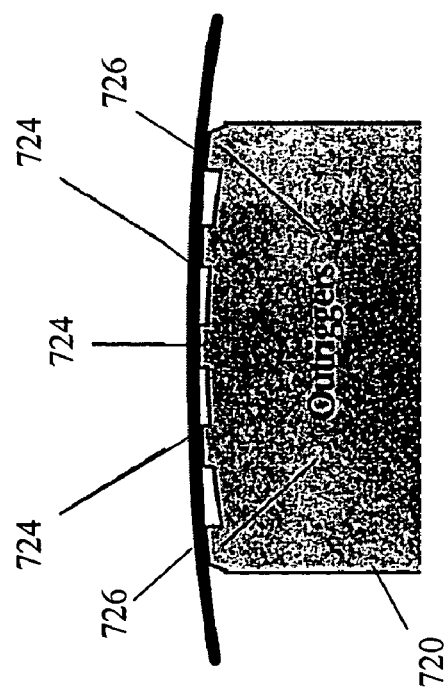
FIG. 7 illustrates a magnetic head structure including islands and outriggers.

Various exemplary head structures and methods of manufacturing magnetic read and/or write heads are provided. The following description is presented to enable any person of ordinary skill in the art to make and use various aspects of the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

In one aspect, an exemplary magnetic head assembly may provide reduced pressure per unit area and reduced magnetic tape and head wear by controlling the wrap angle between the magnetic tape and portions of the magnetic head structure, e.g., a data island or bump of the head structure, through the use of mini-outriggers adjacent the data island. The wrap angle is generally the angle established between a tangent plane to the radius of a data island and a plane between the edge and the adjacent support structure of an island (active or not). The wrap angle may also be considered as the angle from the center of radius of curvature of the island across an arc formed by the supporting surface of the island as described, for example, in U.S. Pat. No. 4,809,110, which is incorporated herein by reference in its entirety.

In one example, a magnetic head design includes as a support, closely formed mini-outriggers located at the leading and/or trailing edge of a data island. The mini-outriggers provide a support surface relative to the larger surface that determines a wrap angle of the tape to the larger surface. The vertical height and radius of the mini-outriggers relative to the active data island is adaptive and adjusts during manufacturing based on characteristics of data island surface. For example, during lapping, the relative height of the mini-outriggers to the main surface of the data island will be reduced. The radius of the data island will influence the wear of the mini-outriggers resulting in a height and radius of the mini-outriggers suited for the wrap angle of the data island. In particular, the radius/wrap angle of the center island may determine the radius/wrap angle of the mini-outriggers after lapping, e.g., the mini-outriggers adjust or wear to effect a desirable wrap angle to the data island and the mini-outriggers. In one example, a lapping tape having properties (e.g., thickness, stiffness, tensions, etc.) similar to that of storage tape may be used and the head lapped until the wrap angle converges to a desired value. In other examples, lapping may be timed to cease when the wrap angle matches a desired value.

In one example, the head may be manufactured by removing material from a monolithic structure through standard machining processes to define a data island(s) and mini-outrigger(s). The material hardness, contour, and width of the data islands and mini-outriggers determine, at least in part, the wear characteristics of each. In order to decrease the relative height of the mini-outriggers to the data island and create a desired wrap angle between the tape and the supporting surface of the data island, the mini-outrigger width is selected to be narrower than the data island. Lapping is well known in the art for conditioning and manufacturing tape heads and lapping may be used to condition the head, where conditioning the head includes wearing the mini-outriggers according to the main data island surface. In one example, the head structure is lapped and the mini-outrigger wears to a height and having a radius of curvature that provides a desired wrap angle of the tape to the surface of the data island. In another example, the wear of the mini-outrigger, based at least in part on the width and contour of the data island, will create an optimum or nearly optimum relative height and contour of the mini-outrigger to the main data island.

The exemplary methods may be used to create a wrap angle to the main data island support surface to within a fraction of a degree, and in one example, within ±0.1 degrees of a desired wrap angle. In one example, the mini-outriggers are lapped during manufacturing such that the wrap angle of the tape to the data islands from the mini-outriggers is less than 3 degrees, in another example less than 0.5 degrees, and in yet another example, 0.2 degrees or less.

The exemplary head assembly may be manufactured at reduced cost and complexity and with greater precision than conventional head structures. For example, conventional contoured head structures are generally manufactured with complex contours to create precise wrap angles within desired tolerances. The complexity to create a conventional contoured head structure with a desired wrap angle comes at a significant cost. In contrast, an exemplary head structure as described below, which may include flat or contoured support surfaces, may be advantageously manufactured through standard processes to create a desired wrap angle by removing material from the head assembly to define mini-outriggers adjacent the data island(s); for example, using conventional processes for forming islands such as machining, etching, or the like. The maximum depth of material removed in forming the mini-outriggers is generally not critical and typically is a function of the manufacturing process. In one example, the minimum depth is selected to be sufficient to continue to provide a desired wrap angle after the surface has been worn down to its final state. The final contour forming of the support structures is according to known lapping processes to create a desired height of the mini-outrigger and resulting wrap angle with the data island. The wear on the mini-outriggers depends, at least in part, on the width and radius of curvature of the data island.

Exemplary head assemblies are described as being particularly useful as part of a linear tape head assembly for use in a magnetic tape head assembly with transducer elements that may include suitable read/write elements, such as magneto resistive read/write elements (often referred to as "MR" heads or elements). Those skilled in the art, however, will understand that the transducer element or core may be a core inductive head, a ferrite core, a thin film gap head, or other type of transducer in which it is useful to provide desired wrap angles to reduce pressure and wear between the storage media and support surfaces of the head.

FIG. 1 illustrates a perspective view of an exemplary magnetic tape head 20 including active data islands 24 having mini-outriggers (not shown). Magnetic tape head 20 is illustrated as a paired head assembly, wherein a given section of the tape is first written upon by a write element and thereafter checked by a read element. A tape 30 is drawn over the surfaces of islands 24, which include active device regions (not shown) having one or more data transducers, e.g., read or write elements. Additionally, tape 30 is drawn over primary outriggers 26. Active device regions may include, for example, a column of 16 write transducers and a column of 16 read transducers.

An exemplary magnetic tape 30 is illustrated in FIG. 1 advancing across the support surface 22 of magnetic tape head 20. Further, an arrow shown on tape 30 indicates the reversible direction of tape 30 movement relative to magnetic tape head 20, and an arrow shown on head 20 indicates the relative movement of head 20 to the path of tape 30 in a direction generally orthogonal to the direction of tape 30 advancement. The movement of magnetic tape head 20 allows head 20 to align read and/or write transducers in the active regions to read and/or write information along one or more different data tracks arranged longitudinally along tape 30; for example, a suitable servo system may send position signals to a controller which in turn controls an actuator for translating head 20 relative to tape 30.

Exemplary tape drive systems that may include an exemplary head described herein are disclosed in U.S. Pat. No. 6,188,532, entitled "BACKWARD COMPATIBLE HEAD AND HEAD POSITIONING ASSEMBLY FOR A LINEAR DIGITAL TAPE DRIVE," and U.S. Pat. No. 6,369,982, entitled "FLOATING TAPE HEAD HAVING SIDE WINGS FOR LONGITUDINAL AND AZIMUTH PLAY BACK WITH MINIMIZED TAPE WRAP ANGLE," both of which are incorporated by reference herein in their entirety.

Figure 2A:
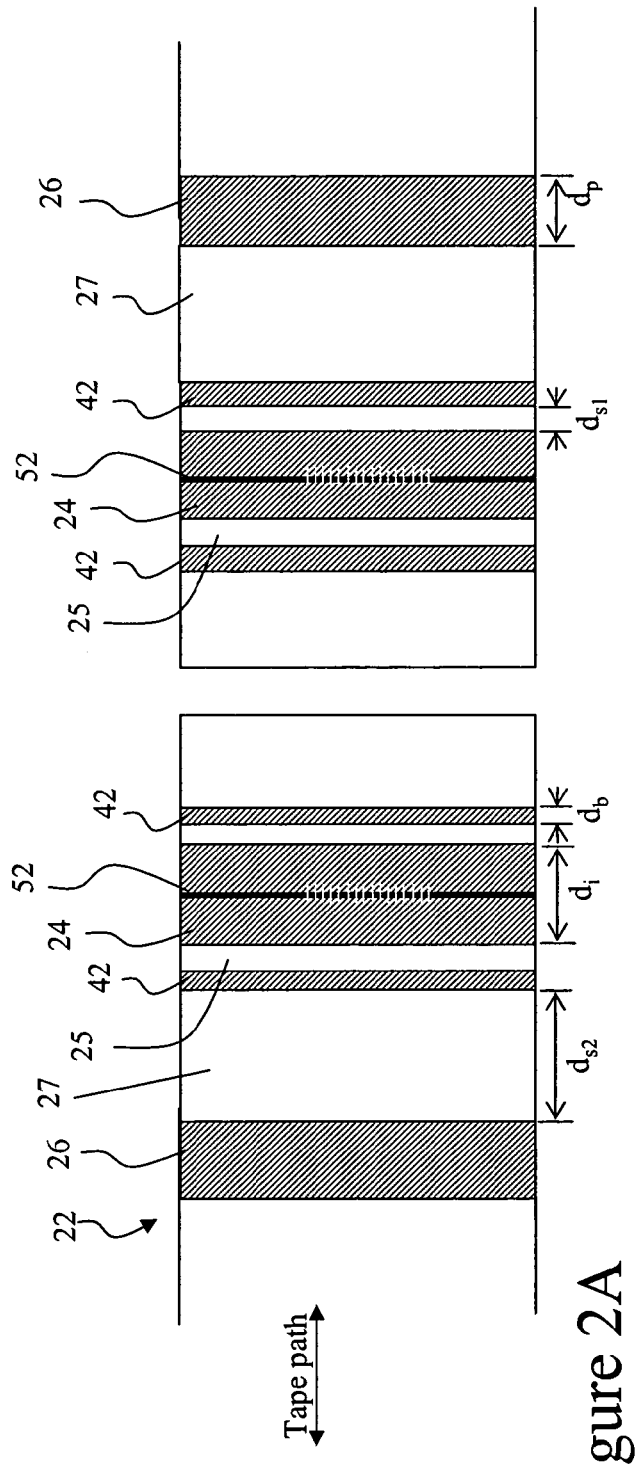
FIGS. 2A and 2B illustrate a plan view and side view of an exemplary head structure including data islands having mini-outriggers.
Figure 2B:
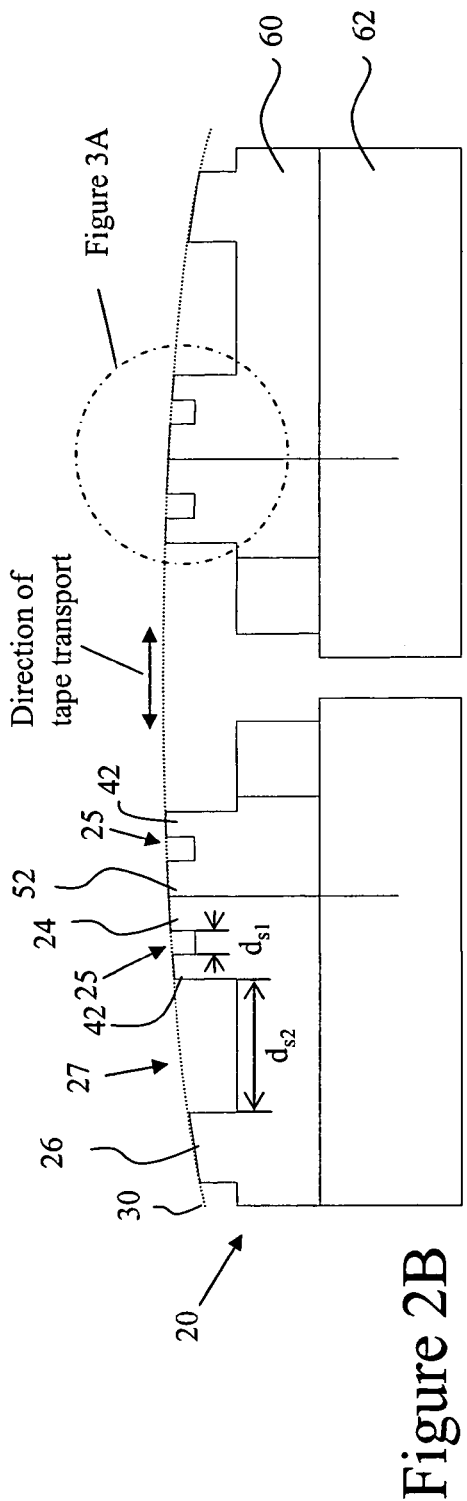

With reference to FIGS. 2A and 2B, a more detailed view of exemplary thin film head structure 20 is illustrated. In particular, FIG. 2A illustrates a top view of supporting surface 22 of head 20 including primary outriggers 26 and data islands 24 including active device region 52, and mini-outriggers 42. Mini-outriggers 42 are separated from island 24 by a void or separation 25 and primary outriggers 26 are separated from data islands 24 and mini-outriggers 42 by a void or separation 27. FIG. 2B illustrates a side view of head 20 and magnetic storage tape 30 passing over primary outriggers 26 and data islands 24.

Tension is applied to tape 30 as tape 30 advances across head 20 and results in tape 30 exerting a pressure against head 20. In particular, pressure is exerted against support surfaces of data islands 24, mini-outriggers 42, and primary outriggers 26. The pressure is generally uniform along the direction transverse to the direction of advancement of tape 30. The pressure is generally proportional to the tension and the wrap angle to the particular surface, and inversely proportional to the width of the particular support surface. The pressure on islands 24 may be altered, for example, by modifying the tension in the tape, by modifying the wrap angle of the tape with islands 24, or by modifying the width (along the direction of tape advancement) of the support surface of islands 24. In particular, the local pressure on the surface of tape 30 is generally increased by increasing the tension in tape 30, by increasing the wrap angle of tape 30 on islands 24, or by decreasing the width of the support surface. Generally, decreased pressure between the storage tape 30 and data islands 24 results in an increase in life of the storage tape 30 and head 20. Accordingly, by decreasing the wrap angle between the plane of tape 30 as it approaches data island 24 and the surface of data island 24, pressure between tape 30 and data island 24 will decrease.

Magnetic head 20 includes mini-outriggers 42 formed on opposite sides of an active data island 24, e.g., trailing and leading island 24. The vertical height and horizontal separation (as seen in FIG. 2B) of mini-outriggers 42 from island 24 are such that a desired wrap angle of tape 30 to the supporting surface of data island 24 is achieved. In particular, the wrap angle, e.g., the angle at which the plane of the support surface of island 24 and a plane of magnetic tape 30 interact, may be varied by varying the position, width, and height of mini-outriggers 42. In one exemplary manufacturing method, structures of head 20 are defined from a monolithic material or composite material by machining to form data islands 24 and outriggers 26 and 42. The structure is then lapped to reduce the height of mini-outriggers 42 and create a desired wrap angle to islands 24. The width of mini-outriggers 42 is less than the data island 24 surface and will therefore be removed during lapping at a greater rate than the data island 24 surface.

In one example, data island 24 is substantially unchanged during the lapping, i.e., very little material is removed from the surface. Therefore, a wrap angle may be preselected or predetermined according to the width and contour, e.g., radius of curvature or the like, of data island 24 and the width and position of mini-outrigger 42. During a lapping process, e.g., with a given amount of time, pressure, etc., a lapping tape will wear and remove material from mini-outrigger 42 such that the vertical height is stepped with respect to island 24 and the radius of curvature of mini-outrigger 42 is reduced. Further, in some examples each mini-outrigger 42, on opposing sides of island 24, may have different curvatures and/or heights relative to the support surface of island 24. For example, as mini-outriggers 42 are worn and adapt during lapping the height and curvature of each mini-outrigger 42 may vary.

In this example, head 20 further includes primary outriggers 26, often referred to as inactive islands or bumps. Primary outriggers 26 may be included and configured to provide a desired wrap angle of tape 30 to the mini-outriggers 42. Additionally, primary outriggers may serve to clean debris from tape 30 and steady the motion of tape 30 over data islands 24 as is generally known in the art. In one example, wrap angles to the primary outriggers are between approximately 2-5 degrees.

The basic principles described are applicable to a wide range of mini-outrigger sizes and configurations. Generally, the actual head and manufacturing efficiency determine the upper limit of ratios between the islands and mini-outrigger dimensions. In one example, the width, $d_i$, of island 24 is between 0.010 to 0.020 inches, the width, $d_{s1}$, of separation between islands 25 and mini-outriggers 42 is approximately 0.0040 to 0.08 inches and the support surface width, $d_b$, of mini-outriggers 42 is approximately 0.0040 to 0.08 inches. In contrast, the width, $d_{s2}$, of space 27, between primary outrigger 26 and mini-outrigger 42 is approximately 0.020 to 0.030 inches, and the width, $d_p$, of primary outrigger 26 is 0.010 to 0.020 inches.

In one example, the radius of curvature of data island 24 may range from 0.30 to 1.00 inches and be off set from vertical by 2 to 3 degrees. The radius of curvature of mini-outrigger 42 may be approximately 0.0150 to 0.250 inches. Accordingly, in one example, the radius of curvature of mini-outrigger 42 is less than data island 24; in another example, the radius of curvature of mini-outrigger 42 is less than half the radius of curvature of data island 24; and in further examples less than one-third and less than one-quarter. Additionally, primary outrigger 26 may include a radius of curvature of 0.2 to 0.4 inches and be off set from vertical by 9 degrees, for example. Depending on the particular application and desired wrap angle, however, other widths and ratios are contemplated for both the width of separation 25, $d_{s1}$, and the support surface width, $d_b$.

The height of mini-outriggers 42 and data island 24 may vary depending on the particular application and manufacturing methods. For example, separations 25 and 27 may be merely deep enough to provide sufficient wrap angle (e.g., without air bleeding) or could be deep enough to extend significantly deeper as well as extending through at least a portion of head 20. In one example, the height of mini-outrigger 42 extends 0.0050 inches.

FIGS. 3A and 3B illustrate magnified side-views of data island 24 and mini-outriggers 42 to illustrates the wrap angle created by the mini-outriggers 42 in greater detail. The support surface of the head in this example includes a total wrap angle across the head structures of approximately 24 degrees (12 degrees for each side). In other examples, the total wrap angle may be approximately 16 degrees, and in yet other examples the head could be a nearly flat surface without curvature. In operation, tape (not shown) streams across the top surface of data island 24 and mini-outrigger 42 creating a wrap angle $\theta$ with data island 24. The wrap angle is determined roughly by the separation and difference in height of the tape exit tangent point at the edge of data island 24 and the corresponding side of the mini-outrigger 42 as defined by the height and radius of mini-outrigger 42. For example, as shown in greater detail in FIG. 3B, the height of mini-outrigger 42 is stepped lower than data island 24 as measured along the vertical, and the contour of the surface of island 24 various from outrigger 42. Accordingly, magnetic media, as supported by mini-outrigger 42, approaches the edge of data island 24 along a plane from the left edge of mini-outrigger 42 to the right edge of data island 24. The plane forms an angle $\theta$, the wrap angle, with the plane of the surface of data island 24. In one example, the wrap angle is less than 3°, in another example less than 1°, and in another example less than 0.5°. The wrap angle, $\theta$, to island 24 may be varied for different applications and desired effects.

In one example, for a multi-bump head, the radius of curvature of each data island "R" approximates the "natural curvature" of the tape. Various aspects of exemplary head configurations, including data islands and outriggers having a running radius or wrap angle approximating the "natural curvature" of the tape are described, for example, in U.S. Pat. No. 4,809,110, entitled NARROW CONTOUR HEAD ASSEMBLY, which is hereby incorporated by reference in its entirety as if fully set forth herein. Broadly speaking, the "natural curvature" of the tape is the radius of the smallest circle the tape can form without breaking, and is determined by the inherent stiffness of the tape, N, the tension applied to the tape, T, and the wrap angle $\theta w$, in accordance with the formula: $\theta wRn=2\sqrt{(N/T)}$.

It will be noted that N, being an inherent property of the tape, is predetermined. For currently available magnetic tapes N is on the order of 0.0001 ($10^{-4}$), for example. The tension, T, is also constrained by external factors such as the power of the drive motors and the tensile strength of the tape itself. It is generally desirable that T be kept as small as is consistent with maintaining good contact between the tape and the head. It has been found that data island with a radius of curvature substantially shorter than the natural radius have erratic recording behavior early in the head life due to lift off of the tape from the data island. The data island will wear down rapidly and, because of lift-off, irregularly, creating a large volume of debris which tends to stick to the tape causing high error rates. Because of the wear-in irregularities, the data island may never attain a smooth steady-state radius, but may continue to have a significant wear rate throughout its life. Data islands having a radius of curvature substantially greater than the natural radius of curvature of the tape also have been found to wear irregularly and cause media failures. In contrast, data islands having a radius of curvature no less than about half the natural radius have been found to wear in rapidly without much lift-off to a contour approximating the natural curvature of the tape, and to have negligible wear thereafter. As a result, an extremely long head life can be expected from the lower wrap angle and the resultant reduction in the pressure between the head and tape. Accordingly, in one example, the radius "R" of the data islands is manufactured to be approximately ½ to ⅔ of the natural radius of curvature of the tape. Additionally, the radius "r" of the mini-outriggers is less than "R;" in one example, ½ of R, and in other examples ⅓ or ¼ of R.

It will be understood, however, that various other factors and consideration may be taken into account in selecting a desired radius of curvature of the data islands, and the above discussion is illustrative only of one example. Further, one may find many solutions to the basic equations relating to the natural radius, however, generally it is desired to reduce the pressure and wear on the tape and head.

Figure 4A:
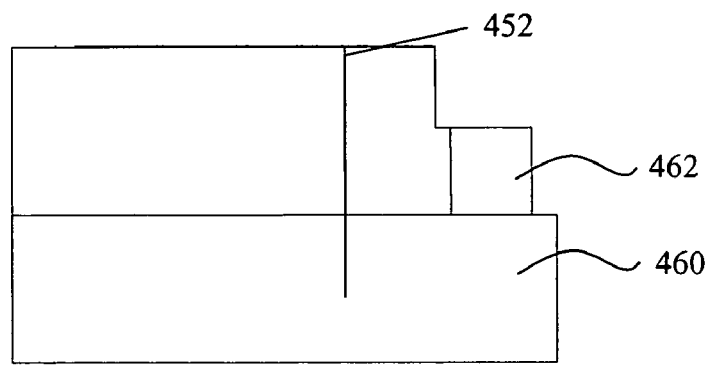
FIGS. 4A-4D illustrate an exemplary method for lapping a head structure including a data island and a pair of mini-outriggers.

FIGS. 4A-4D illustrate an exemplary process for fabricating an exemplary head structure including a data island with mini-outriggers. FIG. 4A illustrates a cross-section of head 420 including a substrate layer 460, device layer 462, and active device 452 formed therein. Substrate layer 460 may include any suitable material including, e.g., AlTiC, Zirconia, CaTi, ferrite materials, or the like and device layer 462 may any suitable material including, e.g., AlTiC, Zirconia, CaTi, ferrite materials, or the like. Active device 452 may include data transducers formed by any suitable method and of any suitable material. For example, conventional deposition and etching techniques and the like may be used. The top surface of device layer 462 is broken by a gap through which the magnetic pattern on the tape interacts with the field surrounding the head core.

Figure 4B:
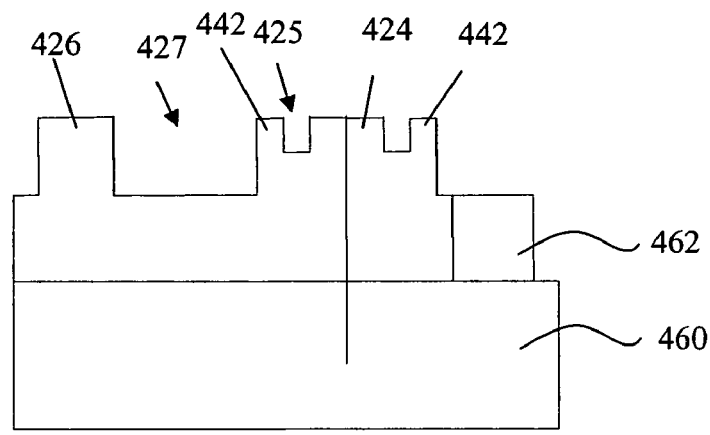

FIG. 4B illustrates the exemplary head structure after processing to form separations 425 and 427 thereby defining data islands 424, mini-outriggers 442, and primary outriggers 426. In one example, a method of manufacturing the magnetic head includes removing a portion of the head structure to define an active data island 424 and mini-outrigger 442 as described above. Any suitable method may be used for removing portions of the head structure to form separations 425 and 427. For example, machining, laser ablation, dry or wet etches, plasma etch, or other suitable methods may be employed. Additionally, in other examples, selective deposition of materials may create islands 424, mini-outriggers 442, and primary outriggers 426.

Head 420 may include various suitable materials for magnetic storage devices. Exemplary materials include, but are not limited to, AlTiC, Zirconia, CaTi, ferrite materials, or the like. In one example, head 420 includes a monolithic material in which separations 425 and 427 are formed. In other examples, island 424 and mini-outrigger 442 may include different materials having different wear characteristics to achieve a desired wrap angle. For example, island 424 may include material(s) having more or less wear resistance than material(s) included in mini-outriggers 442. Additionally, in this example, active device region 452 includes magneto-resistive (MR) elements. Head 420 and MR elements may include various suitable materials and configurations known in the art; for example, suitable MR or giant magnetoresistive materials.

Figure 4C:
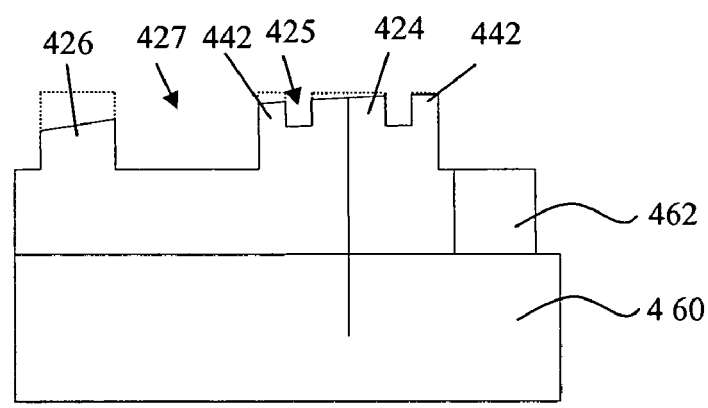
Figure 4D:
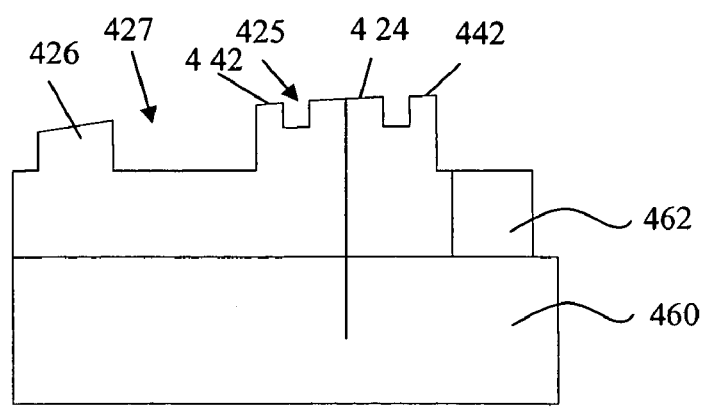

After separations 425 and 427 have been formed, a lapping tape is used to remove portions of the head structure and create a desired wrap angle as shown in FIG. 4C. As discussed above, the positioning and width of the mini-outrigger 442 may be adjusted depending on, for example, the materials, tape speed, and the like to create a predetermined or desired wrap angle of the tape with island 424. Initially, the wrap angle from mini-outrigger 442 to island 424 is at or near zero, e.g., the height of mini-outrigger 442 is similar to the surface of island 424 (or consistent with a radius of curvature of device layer 462). As the lapping tape is streamed across the head, mini-outrigger 442 will wear or depress more than the support surface of island 424 because of the higher wrap angle to mini-outrigger 442 and thinner support surface of mini-outrigger. The relative height of mini-outrigger 442 (in this figure to the left of island 424) thereby increases the wrap angle of the tape with respect to the island 424. In one example, the lapping process may be timed to effect a desired wrap angle to a high degree. For example, typically lapping process can effect a desired wrap angle to within ±0.1 degrees.

In one example, a lapping tape including more highly corrosive material(s) than typical tape, such as a conventional diamond lapping tape, chromium dioxide, and the like, may be used initially to wear down primary outrigger 426 and mini-outriggers 442 to create a desired wrap angle with island 424. In one example, the wrap angle between tape and the edge of the support surface of island 424 is between 1 and 2 degrees or less. Further, the wrap angle between tape and primary outriggers 426 is between 3 and 5 degrees. The angles described are relative to horizontal, however, the drive itself may provide additional wrap angle, e.g., an additional 3 degrees, for a total wrap angle of 12 degrees to each side of the exemplary head. The wrap angles may depend on the particular application and design. It should be recognized that other wrap angles are possible and contemplated. Additionally, secondary lapping tapes may be used for further manufacturing or pre-conditioning of the head structures before use.

FIGS. 5 and 6 illustrate other exemplary head structures 520 and 620. FIG. 5 illustrates an exemplary head 520 including a single mini-outrigger 542 corresponding to each data island 524. In this example, the single mini-outrigger is shown toward the outside of data island 524, but in other examples, mini-outriggers may be placed toward the inside of data island 524. Mini-outrigger 542 may be manufactured similarly to mini-outriggers described above. Additionally, multiple mini-outriggers may be included on either side of data island 524. Additionally, one or more mini-outriggers may be placed adjacent primary outrigger 526.

FIG. 6 illustrates an exemplary head 620 including mini-outriggers 648 disposed on either side of primary outrigger 626 along a direction of tape transport. In this example, mini-outriggers 648 may provide a more uniform wrap angle to primary outrigger 626, reduced pressure between tape and primary outrigger 626, and the like. In other examples, mini-outriggers 648 may be included on a single side of primary outrigger 626, for example, on the outside or inside of primary outrigger 626.

Those of ordinary skill in the art will recognized that additional outriggers and/or mini-outriggers may be included or omitted in exemplary head designs. Also, exemplary heads herein have been described as paired data islands, but in other examples a head may include one or any number of data islands. For example, a common configuration includes three data islands having a center write data island and two read data islands on either side. One or more data islands in any multi-bump system may include one or more mini-outriggers to effect a desired wrap angle. Further, multiple mini-outriggers may be used on each side of a data island.

The above detailed description is provided to illustrate exemplary embodiments and is not intended to be limiting. It will be apparent to those skilled in the art that numerous modification and variations within the scope of the present invention are possible. For example, various support surface contours and separation widths may be used. Further, numerous other materials and processes not explicitly described herein may be used within the scope of the exemplary methods and structures described as will be recognized by those skilled in the art. Accordingly, the present invention is defined by the appended claims and should not be limited by the description herein. Additionally, particular examples have been discussed and how these examples are thought to address certain disadvantages in related art. This discussion is not meant, however, to restrict the various examples to methods and/or systems that actually address or solve the disadvantages.

The invention claimed is:

1. A method for manufacturing a magnetic head for use with a magnetic storage medium, comprising:

forming islands in a magnetic head structure to define a mini-outrigger adjacent a data island, wherein a supporting surface of the data island is separated from a supporting surface of the mini-outrigger by a void, and a width of the supporting surface of the data island is greater than a width of the supporting surface of the mini-outrigger along a direction of media transport; and lapping the magnetic head structure to remove a portion of the mini-outrigger, thereby creating a wrap angle with the supporting surface of the data island.

2. The method of claim 1, wherein lapping comprises removing the portion of the mini-outrigger while leaving the data island surface substantially unchanged.

3. The method of claim 1, wherein the mini-outrigger adapts to the data island surface contour and width when lapped.

4. The method of claim 1, wherein lapping comprises lapping according to a known lapping function to remove a predetermined portion of the mini-outrigger surface.

5. The method of claim 1, wherein forming comprises etching.

6. The method of claim 1, wherein forming comprises machining.

7. The method of claim 1, wherein the wrap angle is less than 3 degrees.

8. The method of claim 1, wherein the wrap angle is less than 1 degree.

9. The method of claim 1, wherein the wrap angle is less than 0.5 degrees.

10. The method of claim 1, wherein the data island includes a radius of curvature and the mini-outrigger includes a radius of curvature, and the radius of curvature of the mini-outrigger is less than the radius of curvature of the data island.

11. The method of claim 10, wherein the radius of curvature of the mini-outrigger is between one-third and two-thirds of the radius of curvature of the data island.

12. The method of claim 10, wherein the radius of curvature of the mini-outrigger is less than one half of the radius of curvature of the data island.

13. The method of claim 1, wherein the width of the mini-outrigger along the direction of media transport is less than 8 milli-inches.

14. The method of claim 1, wherein the width of the data island along the direction of media transport is between 10 and 50 milli-inches.

15. A method for manufacturing a magnetic head for use with a magnetic storage medium, comprising:

forming islands in a magnetic head structure to define a mini-outrigger adjacent a data island, wherein a supporting surface of the data island is separated from a supporting surface of the mini-outrigger by a void, a width of the supporting surface of the data island is greater than a width of the supporting surface of the mini-outrigger along a direction of tape transport, and an initial height of the supporting surface of the data island and the supporting surface of the mini-outrigger are equal; and lapping the head structure including the supporting surface of the data island and the supporting surface of the mini-outrigger, wherein the lapping removes a greater portion of the mini-outrigger than the data island.

16. The method of claim 15, wherein lapping comprises removing the portion of the mini-outrigger while leaving the data island surface substantially unchanged.

17. The method of claim 15, wherein the mini-outrigger adapts to the data island surface contour and width when lapped.

18. The method of claim 15, wherein lapping comprises lapping according to a known lapping function to remove a predetermined portion of the mini-outrigger surface.

19. The method of claim 15, wherein forming comprises etching.

20. The method of claim 15, wherein forming comprises machining.

21. The method of claim 15, wherein the wrap angle is less than 3 degrees.

22. The method of claim 15, wherein the wrap angle is less than 1 degree.

23. The method of claim 15, wherein the wrap angle is less than 0.5 degrees.

24. The method of claim 15, wherein the data island includes a radius of curvature and the mini-outrigger includes a radius of curvature, and the radius of curvature of the mini-outrigger is less than the radius of curvature of the data island.

25. The method of claim 24, wherein the radius of curvature of the mini-outrigger is between one-third and two-thirds of the radius of curvature of the data island.

26. The method of claim 24, wherein the radius of curvature of the mini-outrigger is less than one half of the radius of curvature of the data island.

27. The method of claim 15, wherein the width of the mini-outrigger along a direction of tape transport is less than 8 milli-inches.

28. The method of claim 15, wherein the width of the data island along a direction of tape transport is between 10 and 50 milli-inches.

* * * * *